United States Patent [19]

Galer

[11] Patent Number: 4,753,362

[45] Date of Patent: Jun. 28, 1988

[54] THERMOPLASTIC DRUM CONFIGURATION

[75] Inventor: Herbert W. Galer, Newnan, Ga.

[73] Assignee: Container Products, Inc., Southfield, Mich.

[21] Appl. No.: 84,137

[22] Filed: Aug. 12, 1987

[51] Int. Cl.[4] .............................................. B65D 7/00
[52] U.S. Cl. ...................................... 220/66; 220/5 R
[58] Field of Search ................... 220/66, 5 R, DIG. 1; 215/1 C

[56] References Cited

U.S. PATENT DOCUMENTS

| | | | |
|---|---|---|---|
| 2,696,323 | 12/1954 | Sanderson | 220/5 R |
| 4,088,239 | 5/1978 | Uhlig | 220/5 R |
| 4,171,751 | 10/1979 | Schütz | 220/5 R X |
| 4,500,007 | 2/1985 | Stoll, III | 220/5 R X |

Primary Examiner—Steven M. Pollard

[57] ABSTRACT

A thermoplastic blow-molded drum employs, in place of the conventional flat circular top, or a slightly spherical or radially rounded top, a top having a cylindrical surface over most of its area. The cylindrical surface is of a relatively wide radius and based on an axis perpendicular to the drum; it permits the trouble-free use of paper labels and the like which will conform to the cylindrical surface, while also strengthening the corners of the drum chime at the ends of the cylindrical surface by permitting the parison to conform to a surface intersection having less area than that of the sharp corners of the prior art, resulting in a greater thickness and more strength.

4 Claims, 2 Drawing Sheets

THERMOPLASTIC DRUM CONFIGURATION

BACKGROUND OF THE INVENTION

Prior to the present invention, it has been known to make drums as large as 55 gallons by blow-molding, and to employ molds therefor which create flat tops. Such flat tops are acceptacle in the trade because of the traditional shape of metal drums; in addition to the relative ease of design, they permit the ready application of labels, stencils and the like which are necessary to commercial usage.

Blow-molding, however, is not conducive to use in manufacturing containers with sharp corners unless the parison is generated with excesses of thermoplastic material for areas destined to be expanded into the sharp corners. The generation of such irregular parisons is difficult even with computerized controls and frequently results in excess material where it is not wanted or needed. A flat-top 55-gallon drum will of course have a rather sharp corner for the parison to occupy around the entire periphery of the top. Tyipcally, the top chime, representing the intersection of the circular surface of the top of the drum and the cylindrical surface of the body, will be designed as a curved surface having a radius of about one-half inch. This means that the parison must expand outwardly to a point wherein its wall thickness will be significantly reduced at a point where strength is desired. Attempts to alleviate the problem somewhat by employing a slightly protruding spherical surface have not solved the problem and have proven troublesome because of the difficulty of applying labels and stencils to a spherical surface.

DESCRIPTION OF THE INVENTION

I have discovered that the use of a top cylindrical surface of a wide radius will not unduly distort the basic traditional shape of the 55-gallon drum (or other large size), yet at the same time will provide a much more gently curving intersection for a large portion of the periphery of the chime, thus permitting a significantly thicker wall in critical areas of the top. Moreover, my slightly cylindrical surface permits the use of ordinary paper labels and the like for the top because it is curved only in one plane.

My invention also takes advantage of the initial orientation of the parison in the blow mold. The parison is generally wider along the plane of the mold parting line; thus portions of the parison tend to expand more than others regardless of the shape of the mold. I have oriented the cylindrical surface of the drum top so that the portions of the parison which normally stretch more than others are employed in the areas of the chime with the largest radius; thus the thickness of the wall around the circumference of the drum top edge tends to be approximately constant. My invention will be further explained with reference to the accompanying drawings.

DETAILED DESCRIPTION OF THE DRAWINGS

Figure 1:
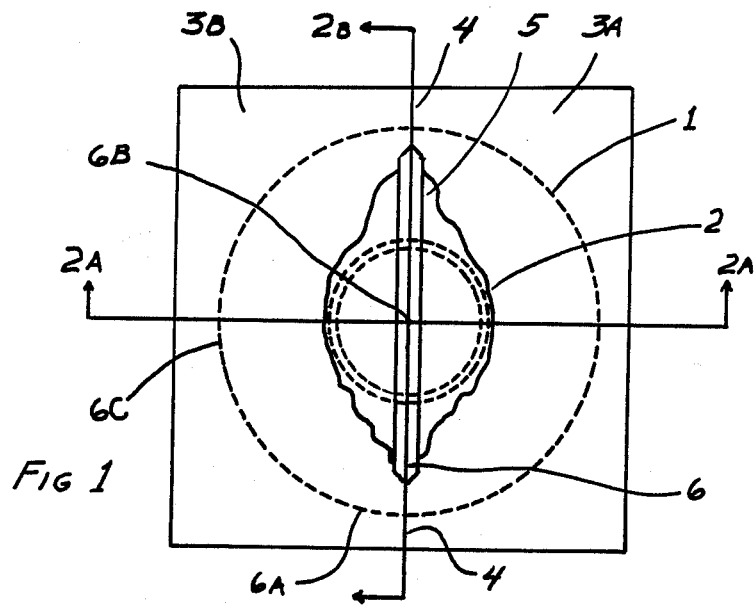
FIG. 1 is a more or less diagrammatic depiction of an overhead view of the expansion of a parison in a cylindrical mold.

Referring now to FIG. 1, the circular mold wall 1 represents an overhead section of a cylindrical mold for a thermoplastic drum. Parison 2 has been inserted into the mold parts 3A and 3B. It is pressed flat as illustrated at 5, at the parting line 4 when mold parts 3A and 3B are closed. Since the parting line 4 is relatively long, portions of it such as parison portion 6 are considerably closer to wall 1 than are other portions such as 6B. Expansion or stretching of the parison from portion 6 to point 6A on wall 1 is less than that of portion 6B expanding to point 6C on wall 1.

My invention minimizes the thinning of the parison material at point 6C and generally in areas relatively far from the initial position of the parison, by orienting a cylindrical surface on the drum top axially perpendicular to the parting line 4.

Figures 2A, 2B:
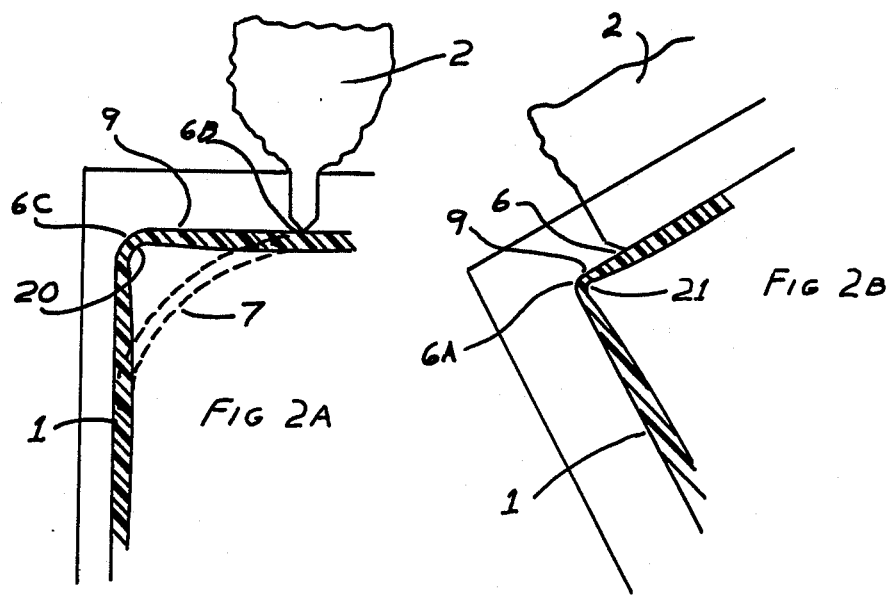
FIGS. 2a and 2b illustrate, more or less diagrammatically, the expansion and thinning of portions of a parison into a 0.5 inch corner as compared to a 1.5 inch corner, specifically as the two curvatures relate to the orientation of the parison.

FIG. 2A and 2B represent the greater stretch distance 90° to the parting line and the shorter stretch distance at the parting line which results in an uneven stretching and thinning of the parison wall. As the parison 7 is expanded by the application of internal gas pressure through an aperture in the blow pin, not shown, the parison wall becomes thinner as its point of contact with mold wall 1 moves up the wall 1 and the point of contact with mold top 9 moves across it to the intersections at 6A and 6C of the top 9 and wall 1.

FIG. 2A is a more or less diagrammatic side sectional view of a plane perpendicular to the parting line 4, i.e. through portions 6B and 6C in FIG. 1. The curved intersection 20 of mold top 9 and wall 1 has an internal radius of about 1½ inches; therefore there is less surface area for the expanding parison 7 to spread over than there is in the intersection 21 of FIG. 2B. FIG. 2B represents a sectional view of the mold and parison along the parting line, specifically to view the portion of the parison and point 6A on wall 1. It should be noted from FIG. 1 that the material of the parison at 6 will have to "travel" over a much shorter distance—that is, it will have to cover much less surface area, than the material at point 6B. Thus, when it arrives at 6A, it will tend to be thicker, and ultimately stronger, than the material would be at 6C without my invention. The wider radius of interval curve 20 as compared to internal curve 21 compensates for the relatively smaller amount of material available to fill the curve. Where the radius of the intersection is about ½ inch as at 21 the parison thickness at 6A becomes considerably less than that of the parison thickness at 6C, where the radius of the intersection is preferably about 1.5 inches.

Figure 3:
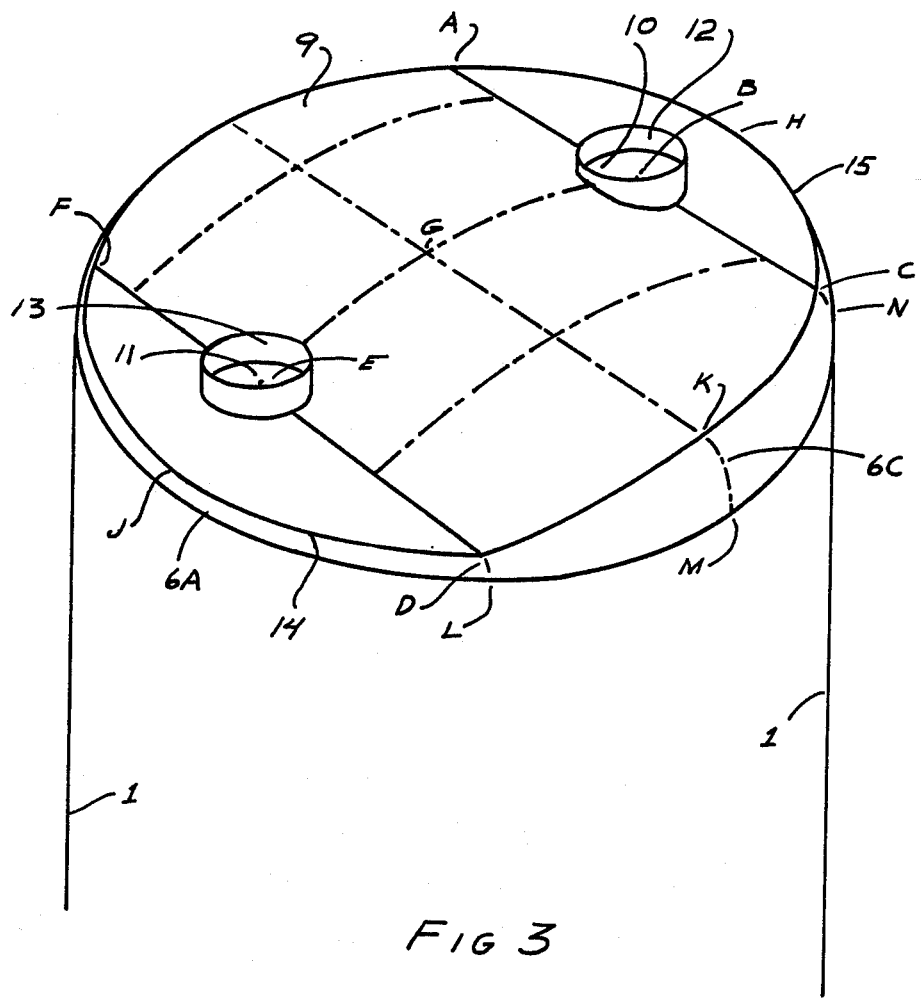
FIG. 3 is a perspective view of a drum of the present invention.

FIG. 3 shows points 6A and 6C from the outside of the finished container. It will be seen that surface ABCDEF is a cylindrical surface wherein the lines ABC and DEF represent the intersections of the cylindrical surface with the flat surfaces of the remaining areas of the container top. Openings 10 and 11 having threaded necks 12 and 13 may be placed on the top 9. Phantom line BGE illustrates the curvature of the cylindrical surface ABCDEF, which is determined by a radius of about 30 inches to about 50 inches for a drum about 36 inches high and 23 inches in diameter. While the intersections 14 and 15 of the flat portions ABCH and DEFJ of top 9 with the vertical wall 1 exhibit a conventional curvature of about 0.5 inch internal radius, the radius of the portion CKDLMN representing the intersection of the two cylindrical surfaces, i.e. the wall 1 and surfaces ABCDEF of the top, has a variable internal radium, increasing from about 0.5 inch at DL to about 1.5 inches at KM and reducing again to 0.5 inch at CN. While point K is farthest on the cylindrical surface ABCDEF from the parting line 4 (see FIG. 1) the parison is not stretched as thin at this point as it would otherwise be without my invention. Not only is the radius of the curvature less severe, but the curvature begins at a point K closer to the parting line 4 than would otherwise be the case. In fact, between points K and M the parison must contact about 18% less surface area than it would if the internal curvature were 0.5 inch, and an additional 3% less surface area because of the reduced circumference of the mean point of curvature of the 1.5" radius as compared to the 0.5" radius. Accordingly, the material which would have been stretched thin to that extent is available to retain the strength of the additional thickness of thermoplastic material. The curvature of the intersection of the two cylindrical surfaces, i.e. CKDLMN, varies gradually from 0.5 at DL and CN to 1.5 at KM—nevertheless the surface at DL and CN is not unduly stretched because of the relatively short distance moved (stretched) by the parison from the parting line 4.

Persons skilled in the art will realize that the portion of the drum top which has a cylindrical surface need not have the particular width shown in FIG. 3. There is no reason why the cylindrical surface could not be as wide as the entire top, thus providing a gradual change in the radius of the internal surface of the intersection of the top and the wall. On the other hand, the beneficial effect of my invention will not be optimally obtained unless the cylindrical surface intersects the wall around at least about one-third of its circumference.

Persons skilled in the art will also appreciate that the cylindrical surface may be varied somewhat so long as the changes in internal radius at the top and wall intersection are not too abrupt and particularly so long as the surface contour is varied only in one plane. That is, a cross-section along line EGB, for example, in FIG. 3 is illustrated in a true circular arc, but could as well for my purposes be a gradual ellipse. Such a gradual elliptical surface is considered to be equivalent to the cylindrical one so long as points C and D do not present sharply angular recesses to the parison. The cylindrical portion of the top should not curve in more than one plane, so that a label may be expected to contact the surface flush at all points.

My invention thus provides both a container top having a monoaxial surface,—that is, one on which a flat piece of paper or label can be placed fully in contact—and one which minimizes the thinning of the wall material as it is stretched to cover the inside of the mold.

I claim:

1. A thermoplastic blow-molded substantially cylindrical drum having a substantially cylindrical drum wall and an integral top characterized by a substantially cylindrical surface thereon axially perpendicular to said wall, the intersection of the substantially cylindrical surface of the top and said wall comprising at least about one-third of the circumference of said drum wass.

2. The thermoplastic blow-molded drum of claim 1 wherein and an integral top characterized by a cylindrical surface thereon axially perpendicular to the wall, the intersection of the cylindrical surface of the top and the drum wall having an external radius ranging between about 0.5 and 1.5 inch.

3. A drum of claim 2 wherein the top also has flat portions on each side of said cylindrical surface, the intersections of said flat portions and said wall having external radii no greater than about 0.5 inch.

4. Method of blow molding a thermoplastic drum comprising (a) providing a parison mold having two parts incorporating a parting line, and a mold cavity defining a generally cylindrical drum body with an integral top having a cylindrically shaped surface portion, said cylindrically shaped surface portion having an axis perpendicular to the axis of the drum body, the intersection of said cylindrically shaped surface portion of said mold with said drum body portion of said mold comprising at least about one-third of the circumference of said drum wall and having internal radii no less than those of any point of intersection of said top with said body (b) orienting the parting line of the mold on a plane perpendicular to the axis of said cylindrically shaped surface, (c) inserting a parison in said mold, and (d) expanding said parison to fill the mold.

* * * * *